United States Patent
Presnell (10) Patent No.: US 7,313,232 B1
(45) Date of Patent: Dec. 25, 2007

(54) MONITORING FOR OPERATOR SERVICES

(75) Inventor: Michael Craig Presnell, Durham, NC (US)

(73) Assignee: Nortel Networks Limited, St. Laurent (CA)

( * ) Notice: Subject to any disclaimer, the term of this patent is extended or adjusted under 35 U.S.C. 154(b) by 909 days.

(21) Appl. No.: 10/648,000

(22) Filed: Aug. 26, 2003

(51) Int. Cl.
*H04M 3/00* (2006.01)

(52) U.S. Cl. .......................... 379/265.02; 379/265.03; 379/265.04; 379/265.05; 379/265.06; 379/265.07; 379/265.08; 379/266.01; 379/266.02; 379/266.03; 379/309; 379/142.01; 379/112.01; 379/88.01; 379/88.02; 379/88.03; 379/88.04

(58) Field of Classification Search .......... 379/265.02, 379/265.03, 265.04, 265.05, 265.06, 265.07, 379/265.08, 266.01, 266.02, 266.03, 309, 379/88.01, 88.02, 88.03, 88.04, 142.01, 112.01
See application file for complete search history.

(56) References Cited

U.S. PATENT DOCUMENTS 6,542,602 B1 * 4/2003 Elazar .................... 379/265.06
6,839,323 B1 * 1/2005 Foti ............................. 370/235
7,043,008 B1 * 5/2006 Dewan .................. 379/265.06

OTHER PUBLICATIONS

WO 02/049329 Ilan, Tomer et al. a method and system for monitoring and recording voice from circuit switched switches via a acket switched network. Dec. 12, 2000.*

* cited by examiner

*Primary Examiner*—Quynh H. Nguyen
(74) *Attorney, Agent, or Firm*—Winthrow & Terranova, PLLC (57) ABSTRACT

The present invention provides for efficient monitoring of operator services calls. A packet gateway is provided in association with a telephony switch, such that circuit-switched connections through a switching fabric of the telephony switch are supported by the packet gateway. The packet gateway provides an interface between the switching fabric and a packet network, which supports operator terminals as well as monitor terminals from which interactions between operators and callers may be monitored. Upon setting up the circuit-switched connection for the operator services call, the gateway will establish voice sessions with both the operator terminal and the monitor terminal. The voice sessions with the operator terminal facilitate bi-directional communications with the caller via the circuit-switched connection over the packet fabric. The voice interaction between the caller and operator is provided to the monitor terminal over another voice session for monitoring by the monitor.

24 Claims, 7 Drawing Sheets

MONITORING FOR OPERATOR SERVICES

FIELD OF THE INVENTION

The present invention relates to operator services, and in particular to monitoring operator services.

BACKGROUND OF THE INVENTION

Directory assistance and enhanced operator services systems are capable of providing information in response to a caller's request through automation or via a human operator. In an effort to review operator performance and improve service quality, the interaction between operators and callers is often monitored by a third party. Unfortunately, existing monitoring techniques require a series of connections in a switching fabric of a telephony switch to effectively connect the monitor, caller, and operator to the same call to allow the monitor to listen to the interaction between the caller and the operator. The additional resources required for monitoring generally include additional conference or bridging circuits to effectively connect each party to the call. This use of these additional resources not only imposes expensive inefficiencies in monitoring techniques, but also degrades speech quality due to the need to run the connection through additional resources. There is also excessive control overhead associated with controlling each of the required resources for monitoring. Accordingly, there is a need for a more efficient technique for monitoring operator services.

SUMMARY OF THE INVENTION

The present invention provides for efficient monitoring of operator services calls. A packet gateway is provided in association with a telephony switch, such that circuit-switched connections through a switching fabric of the telephony switch are supported by the packet gateway. The packet gateway provides an interface between the switching fabric and a packet network, which supports operator terminals as well as monitor terminals from which interactions between operators and callers may be monitored. Upon setting up the circuit-switched connection for the operator services call, the gateway will establish voice sessions with both the operator terminal and the monitor terminal. The voice sessions with the operator terminal facilitate bi-directional communications with the caller via the circuit-switched connection over the packet fabric. The voice interaction between the caller and operator is provided to the monitor terminal over another voice session for monitoring by the monitor. By using the packet gateway to facilitate the voice sessions with the operator terminal as well as with the monitor terminal for those sessions that require monitoring, the number of resources on the circuit-switched side of the switch is significantly reduced. Further, the elimination of additional resources also reduces the degradation of the quality associated with the operator services call.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
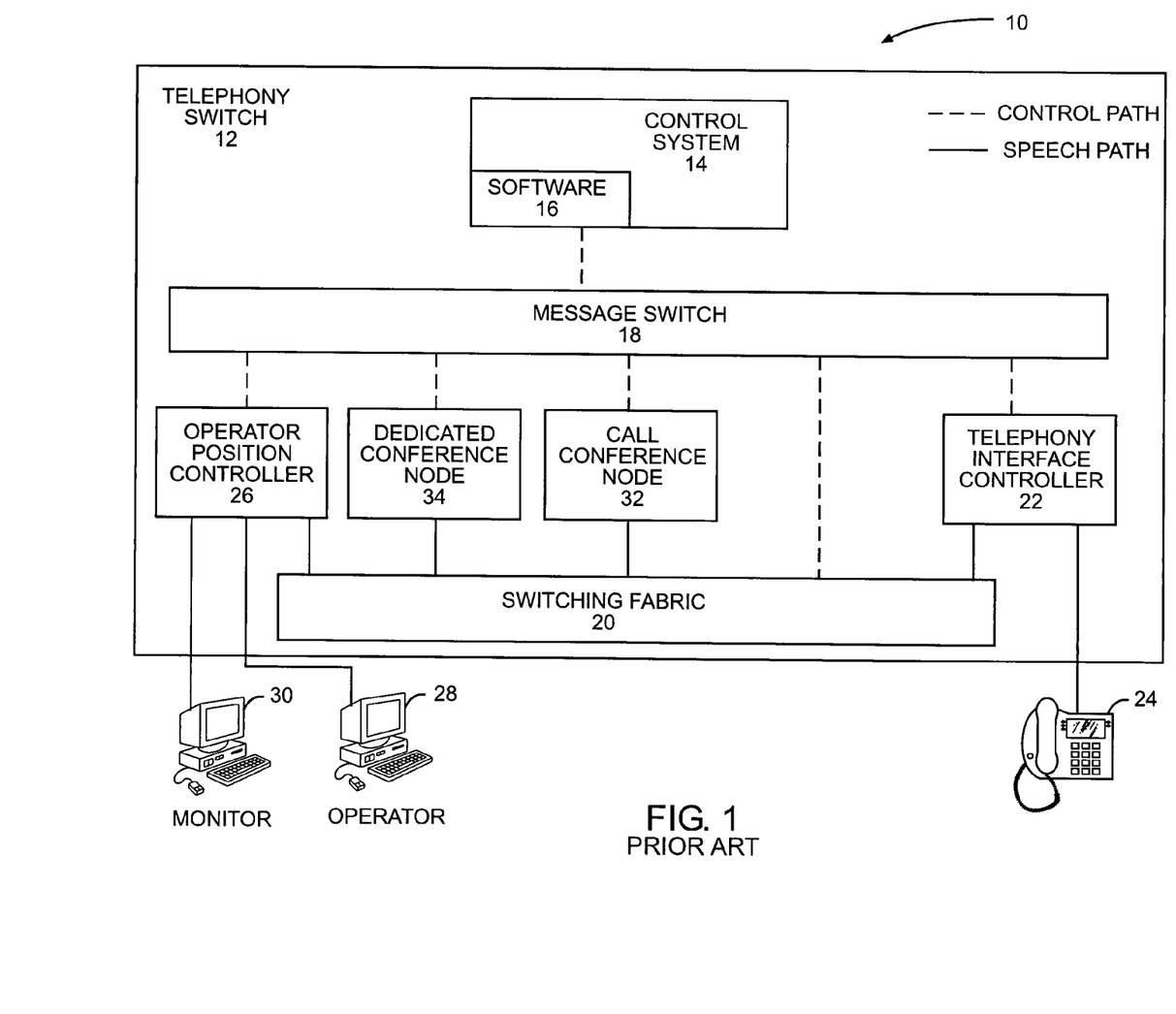
FIG. 1 is a block representation of an operator services environment according to the prior art.

Traditional monitoring of an operator interaction with a caller is resource-intensive. With reference to FIG. 1, a traditional operator services environment 10 is illustrated as being centered around a traditional telephony switch 12. The telephony switch 12 is controlled by a control system 14 having the necessary software 16 for operation and control of various peripherals. The interface between the control system 14 and the peripherals is a message switch 18, which effectively directs and controls the flow of messages between the control system 14 and the peripherals to control operation of the peripherals and facilitate bearer paths, or voice connections, between the peripherals via a switching fabric 20. The switching fabric 20 is generally a digitally-based interconnecting mesh capable of establishing voice connections between any number of these peripherals.

The peripherals may include a telephony interface controller 22, which provides a telephony interface for a subscriber's telephony device 24 or inter-office voice connection (not shown) in a direct or indirect manner. Calls into the telephony switch 12 will be received by the telephony interface controller 22 and routed to an operator position controller 26 via the switching fabric 20. The operator position controller 26 facilitates a) control messaging between operator terminals 28 and the control system 14; b) speech path connections between the switching fabric 20 and the operator terminals 28, and c) operator services-specific database connections (not shown). Further, the operator position controller 26 connects to one or more operator terminals 28, as well as a monitor terminal 30.

For general operator services, a voice connection between the telephony terminal 24 and the operator terminal 28 is provided through the operator position controller 26, switching fabric 20, and telephony interface controller 22, wherein the caller and human operator via the respective telephony terminal 24 and operator terminal 28 can converse with one another to request, provide, and receive information. When such interaction is to be monitored by a monitor, the monitor terminal 30, which is also supported by the operator position controller 26, will be effectively conferenced into or bridged with the connection between the operator and the caller, such that the monitor can listen to the conversation between the operator and the caller. The monitor is able to hear the conversation between the operator and the caller, but the operator and caller cannot hear anything said by the monitor.

In general, a peripheral referenced as a call conference node 32 is used for all operator actions and essentially acts as a port through which the caller is connected to the operator position controller 26. When monitoring is involved, another peripheral referenced as a dedicated conference node 34 must also be employed to essentially connect the monitor terminal 30 into the operator connection. This connection is described in further detail below in association with FIG. 2. Notably, the connections between the various peripherals over the switching fabric 20 are facilitated using traditional Time Division Multiplexing (TDM) methods in a circuit-switched fashion.

Figure 2:
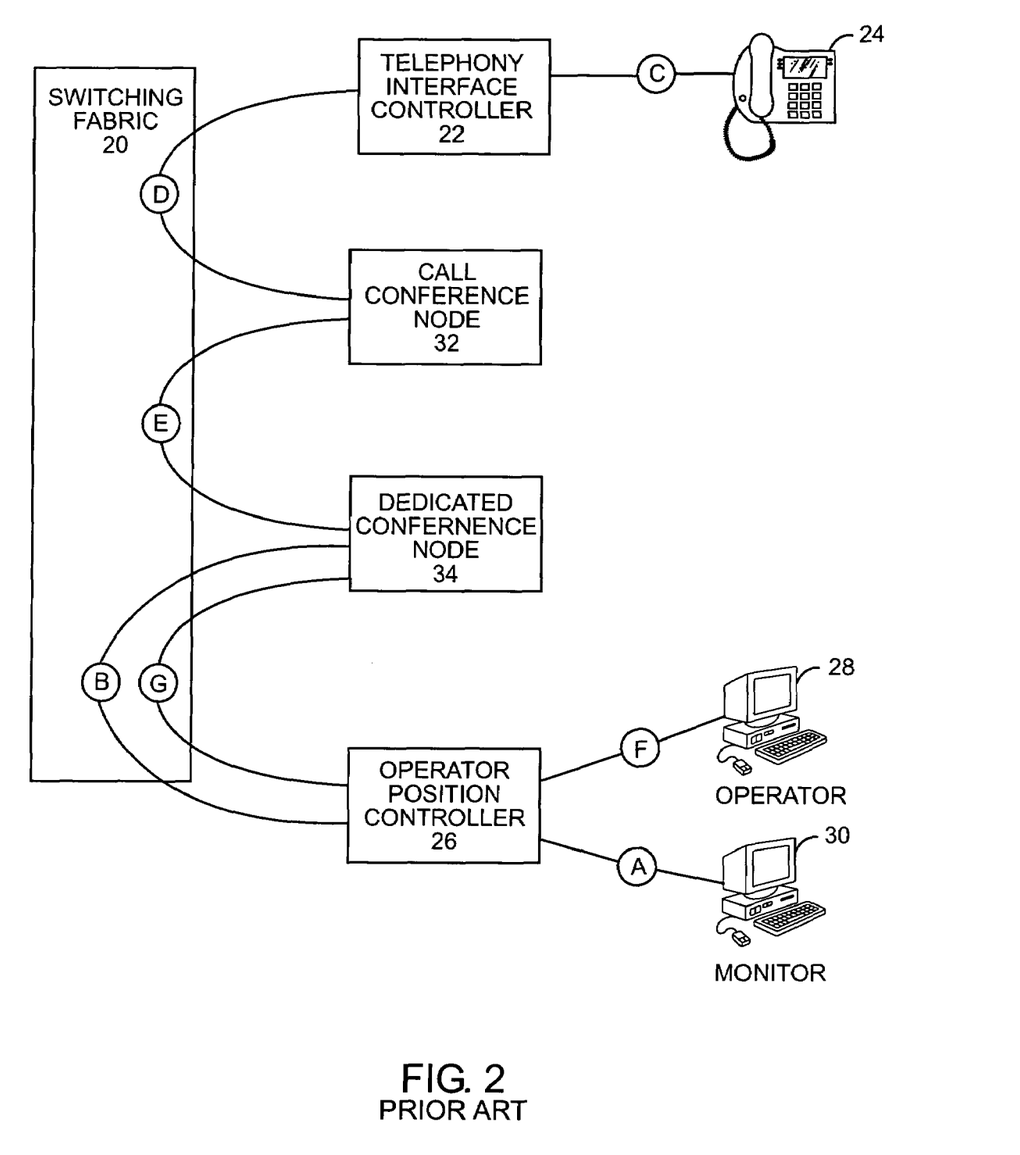
FIG. 2 illustrates an exemplary monitoring technique of the prior art.

With particular reference to FIG. 2, an overview of a monitoring technique is provided using the traditional architecture described in FIG. 1. Initially, a monitor will decide to monitor a particular operator, and as such, the monitor's monitor terminal 30 will be actively connected to the operator position controller 26 (step A), which establishes a speech path through the switching fabric 20 to a dedicated conference node 34 (step B). For the next call directed to the operator to be monitored, a connection between the telephony terminal 24 and the telephony interface controller 22 is established (step C). Next, a connection between the telephony interface controller 22 and the call conference node 32 is established through the switching fabric 20 under the control of the control system 14 (step D). The control system 14 will next establish a connection between the call conference node 32 and the dedicated conference node 34 (step E), wherein the dedicated conference node 34 effectively connects the incoming call to the connection for the monitor (step B). Finally, the operator terminal 28 for the available operator is activated, which establishes a connection with the operator position controller 26 (step F) as well as a connection between the dedicated conference node 34 and the operator position controller 26 (step G). At this point, the dedicated conference node 34 is effectively bridging or otherwise conferencing the connections with the telephony terminal 24, the operator terminal 28, and the monitor terminal 30 such that the caller and operator may communicate with one another. At this point, the monitor can essentially listen to the conversation between the operator and the caller. Preferably, any voice information from the monitor is blocked, dropped, or otherwise ignored, such that it is not sent to other devices. Notably, the control system 14 essentially reserves and allocates ports and facilitates connections between the ports on the various peripherals via the switching fabric 20. As is readily recognized from FIG. 2, numerous peripherals and switching fabric resources must be employed to facilitate monitoring of operator services. Further, the use of additional peripherals and connections to facilitate a call degrade the audio quality associated with the call.

Figure 3:
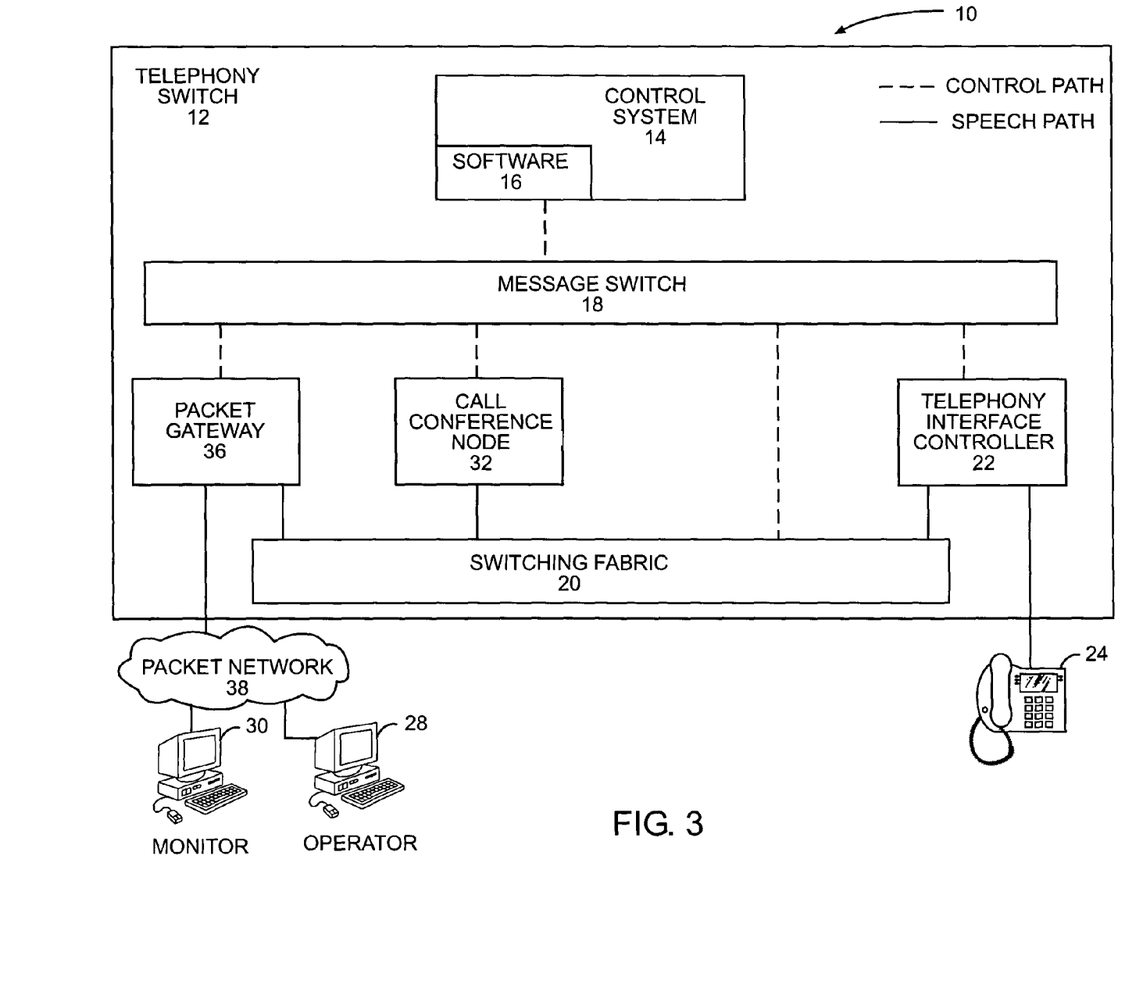
FIG. 3 is a block representation of an operator services environment according to one embodiment of the present invention.

With reference to FIG. 3, the telephony switch 12 is modified according to one embodiment of the present invention. In particular, a dedicated conference node 34 and the voice switching aspects of the operator position controller 26 are effectively replaced by a packet gateway 36, which operates under the control of the control system 14 and provides an interface between a packet network 38 and the (TDM-based) switching fabric 20. The operator terminal 28 and monitor terminal 30 are now packet-based devices capable of communicating over the packet network 38, such as by using Voice-over-Internet Protocol (VoIP). Thus, circuit-switched communications may be provided between the packet gateway 36 and the other peripherals, such as the call conference node 32 and the telephony interface controller 22, while packet-based communications are provided with the operator terminal 28 and the monitor terminal 30 over the packet network 38. Those skilled in the art will recognize how to provide the necessary conversion between packet-based and circuit-switched networks. The packet gateway 36 will be controlled by the control system 14 via the message switch 18.

Figure 4:
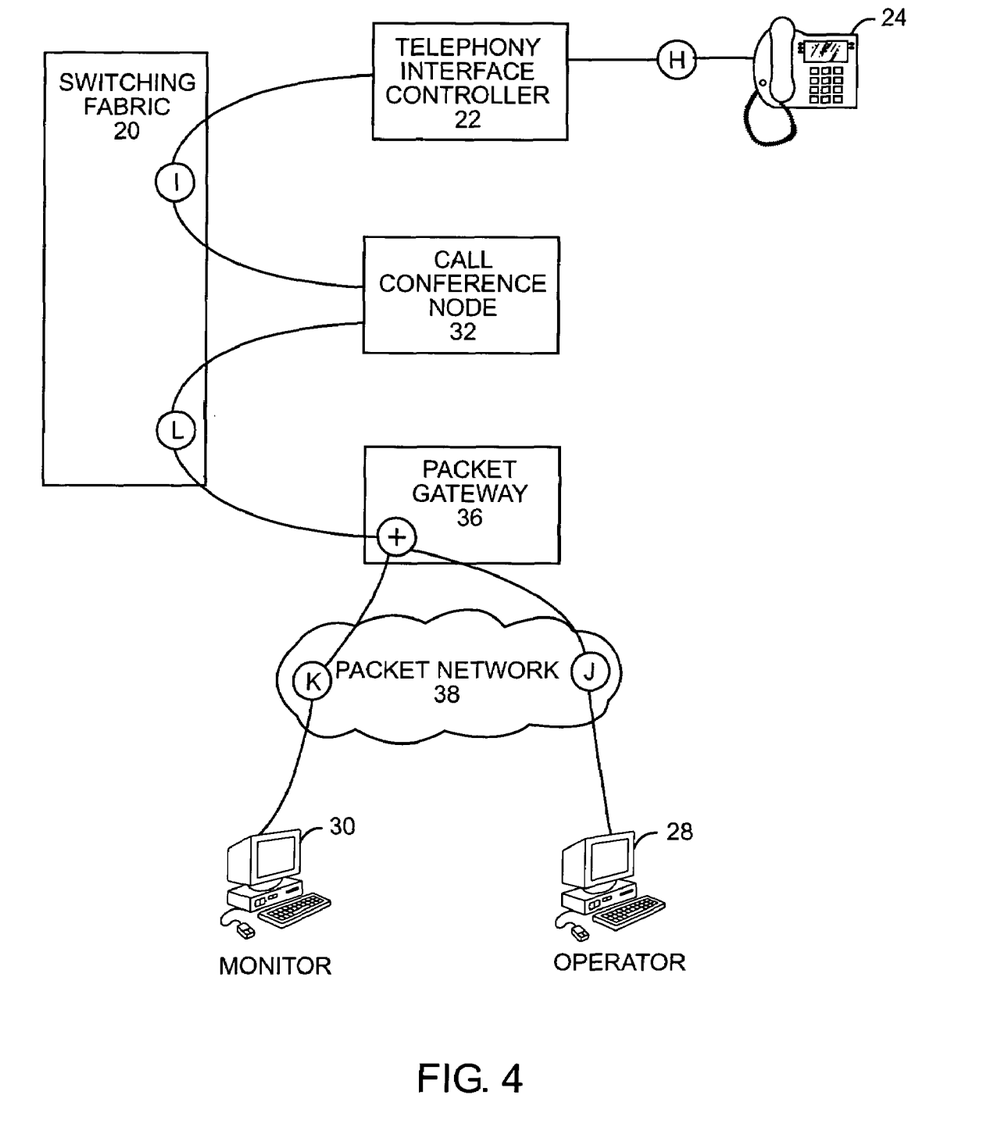
FIG. 4 illustrates a monitoring technique according to one embodiment of the present invention.

With particular reference to FIG. 4, an overview of a monitoring technique is provided using the architecture described in FIG. 3. When a caller initiates a call into the telephony switch 12 to receive operator services, the call comes into the telephony interface controller 22 (step H), wherein the control system 14 will allocate a call conference node 32 to handle the call and establish a connection through the switching fabric 20 between the telephony interface controller 22 and the call conference node 32 (step I). Next, the control system 14 will allocate a port on the packet gateway 36 and establish a connection between the call conference node 32 and the port on the packet gateway 36 (step L). Assuming the call is to be monitored, packet-based connections are established with the packet gateway 36 with both the monitor terminal 30 and the operator terminal 28 over the packet network 38 (steps K and J, respectively). The packet gateway 36 effectively facilitates bi-directional communications between the caller via the call conference node 32 through the switching fabric 20 and the operator terminal 28 over the packet network 38. The communications in both directions between the caller and operator are effectively summed together and sent to the monitor terminal 30, such that the monitor at the monitor terminal 30 may listen to what the caller and operator say during the operator services session. Again, the monitor's voice information is preferably blocked, dropped, or otherwise ignored. Given the ready ability to communicate information to multiple devices over a packet network 38, the packet gateway 36 can readily provide the conversation between the caller and operator to the monitor terminal 30 without requiring resources from the telephony switch 12 in addition to those normally provided during an operator services session, and without causing degradation of the audio quality experienced between the caller and operator.

Figure 5A:
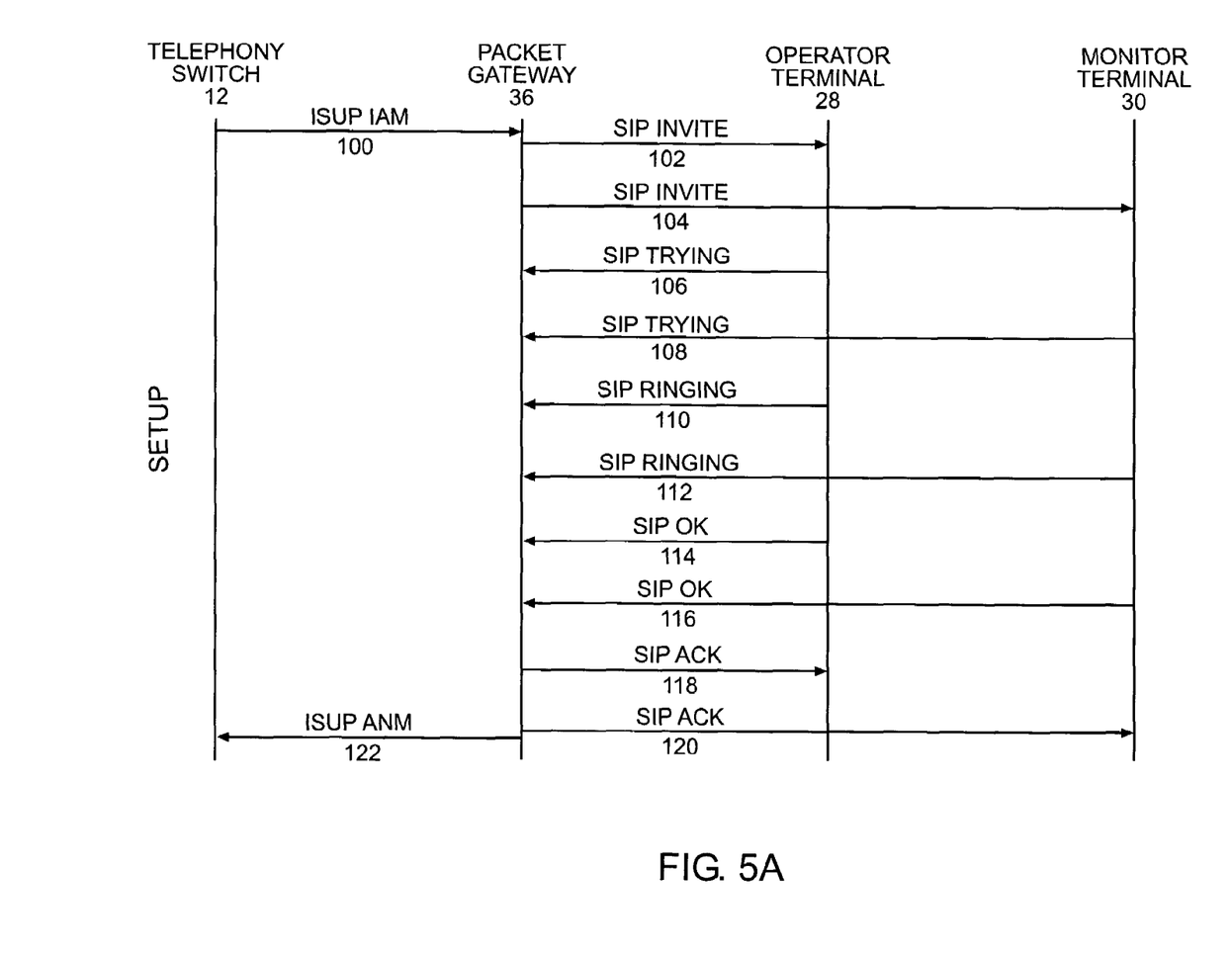
FIG. 5 is a communication flow diagram for monitoring operator services according to one embodiment of the present invention.
Figure 5B:
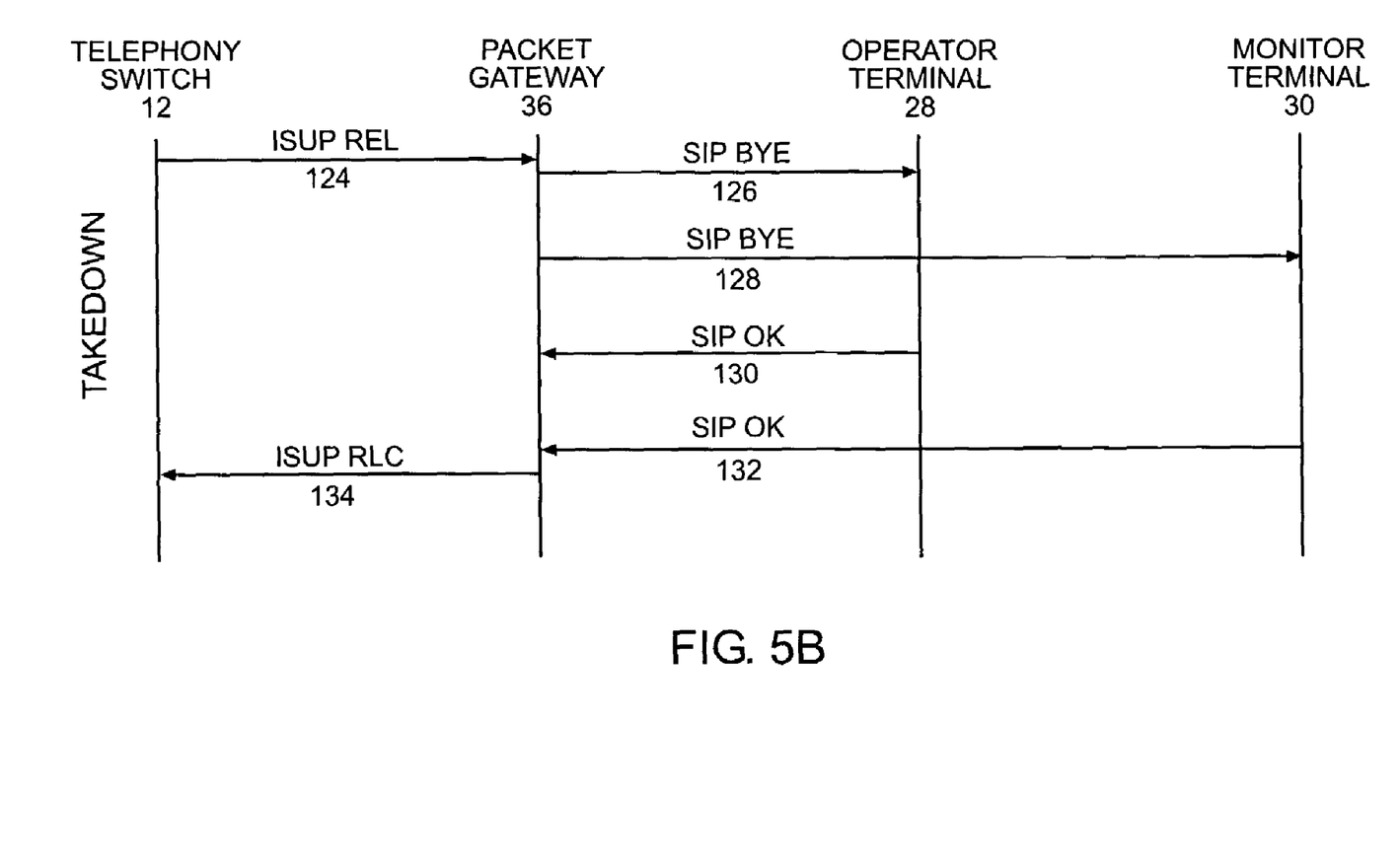

With reference to FIG. 5, a communication flow diagram is provided to illustrate the setup and takedown of an operator services session, which is monitored via the monitor terminal 30. In this embodiment, the telephony switch 12 and the packet gateway 36 are referenced as separate entities. Those skilled in the art will recognize that the term "telephony switch" has numerous connotations depending on the particular environment. In this environment, assume that the telephony switch 12 is coupled to a signaling network (not shown), such as the Signaling Systems 7 (SS7) network, such that the control system 14 will ultimately receive and process Intelligent Network (IN) signaling messages to establish connections between the telephony terminal 24 and the packet gateway 36, which will then take the necessary steps to establish packet sessions with both the operator terminal 28 and the monitor terminal 30.

In this embodiment, the telephony switch 12 and packet gateway 36 support the Q.931 Integrated Services User Part (ISUP) protocol for signaling. Accordingly, new connections in association with a call are initiated with an ISUP Initial Address Message (IAM), which is sent from the telephony switch 12 to the packet gateway 36 in response to receiving indication of the incoming call (step 100). The indication of the incoming call may be an ISUP IAM from another telephony switch (not shown). The ISUP IAM received from the telephony switch 12 by the packet gateway 36 will include some form of indicia indicating that the incoming call is not only an operator services call, but also is one that is to be monitored by the monitor terminal 30. Accordingly, the packet gateway 36 will take the necessary steps to initiate the appropriate packet sessions with the operator terminal 28 and the monitor terminal 30. In this embodiment, session initiation, establishment, and takedown use the Session Initiation Protocol (SIP). The specification for SIP is provided in the Internet Engineering Task Force's RFC 2543: Session Initiation Protocol Internet Draft, which is incorporated herein by reference in its entirety.

In general, SIP may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the packet gateway 36, operator terminal 28, or monitor terminal 30.

A SIP endpoint is generally capable of running an application, which is generally referred to as a user agent (UA), and is capable of facilitating media sessions using SIP. User agents register their ability to establish sessions with a SIP proxy by sending "REGISTER" messages to the SIP proxy. The REGISTER message informs the SIP proxy of the SIP URL that identifies the user agent to the SIP network. The REGISTER message also contains information about how to reach specific user agents over the SIP network, by providing the Internet Protocol (IP) address and port that the user agent will use for SIP sessions.

A "SUBSCRIBE" message may be used to subscribe to an application or service provided by a SIP endpoint. Further, "NOTIFY" messages may be used to provide information between SIP endpoints in response to various actions or messages, including REGISTER and SUBSCRIBE messages.

When a user agent wants to establish a session with another user agent, the user agent initiating the session will send an INVITE message to an endpoint or a SIP proxy therefor (now shown) and specify the targeted user agent in the TO header of the INVITE message. Identification of the user agent takes the form of a SIP URL. In its simplest form, the URL is represented by a number or "<username>@<domain>," such as "janedoe@nortelnetworks.com." The SIP proxy will use the SIP URL in the TO header of the message to determine if the targeted user agent is properly registered. Generally, the user name is unique within the name space of the specified domain.

If the targeted user agent has registered with the SIP proxy, the SIP proxy will forward the INVITE message directly to the targeted user agent. The targeted user agent will respond with a "2000K" message, and a session between the respective user agents will be established as per the message exchange required in the SIP specification. Media capabilities are passed between the two user agents of the respective endpoints as parameters embedded within the session setup messages, such as the INVITE, 2000K, TRYING, RINGING, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

Again, the packet gateway 36 must initiate a voice session with the operator terminal 28 and the monitor terminal 30. Using SIP, the packet gateway 36 will send SIP INVITE messages to each of the operator terminal 28 and the monitor terminal 30 (steps 102 and 104). The Session Data Protocol (SDP) within SIP will identify any ports on the packet gateway 36 to be used for the respective voice sessions. In traditional SIP fashion, the operator terminal 28 and monitor terminal 30 will respond to the SIP INVITE messages with a SIP TRYING message to indicate that each of the operator terminal 28 and the monitor terminal 30 are taking the necessary steps to establish the voice session (steps 106 and 108). When each of the operator terminal 28 and monitor terminal 30 begin ringing or otherwise alerting the respective operator and monitor that a voice session is being established, the operator terminal 28 and monitor terminal 30 will send a SIP RINGING message back to the packet gateway 36 (steps 110 and 112). When each of the operator terminal 28 and monitor terminal 30 are effectively answered or become answered in the voice session, SIP OK messages are sent back to the packet gateway 36 (steps 114 and 116). Using the Session Data Protocol, the SIP OK messages will include information identifying the respective ports on the operator terminal 28 and monitor terminal 30 to which information being sent to those positions should be addressed. In response to the SIP OK messages, the packet gateway 36 will send SIP ACKNOWLEDGEMENT (ACK) messages back to the respective operator terminal 28 and monitor terminal 30 (steps 118 and 120).

At this point, essentially two voice sessions are established between the packet gateway 36 and the operator terminal 28 to facilitate bi-directional communications, and at least one communication session is established between the packet gateway 36 and the monitor terminal 30 such that the packet gateway 36 can send the dialog for the caller and operator interaction to the monitor terminal 30. Once the voice sessions are established between the packet gateway 36 and the operator terminal 28 and monitor terminal 30, the packet gateway 36 will respond to the ISUP IAM with an ISUP Answer Message (ANM) indicating that the operator terminal 28 and monitor terminal 30 are effectively connected to the packet gateway 36 through their respective voice sessions (step 122). At this point, a TDM connection to the packet gateway 36 via the switching fabric 20 is established and any preliminary call signaling necessary to establish the call with the telephony terminal 24 through the telephony interface controller 22 and any other telephony switches has been provided.

Once the operator services session ends, such as when the caller request has been satisfied, the telephony switch 12 will send an ISUP RELEASE (REL) message to the packet gateway 36 (step 124), which will initiate SIP BYE messages to the operator terminal 28 and monitor terminal 30, respectively (steps 126 and 128). The operator terminal 28 and monitor terminal 30 will respond with SIP OK messages (steps 130 and 132), which will trigger the packet gateway 36 to send an ISUP RELEASE COMPLETE (RLC) message back to the telephony switch 12 (step 134), wherein the TDM and packet sessions are effectively taken down or released.

Figure 6:
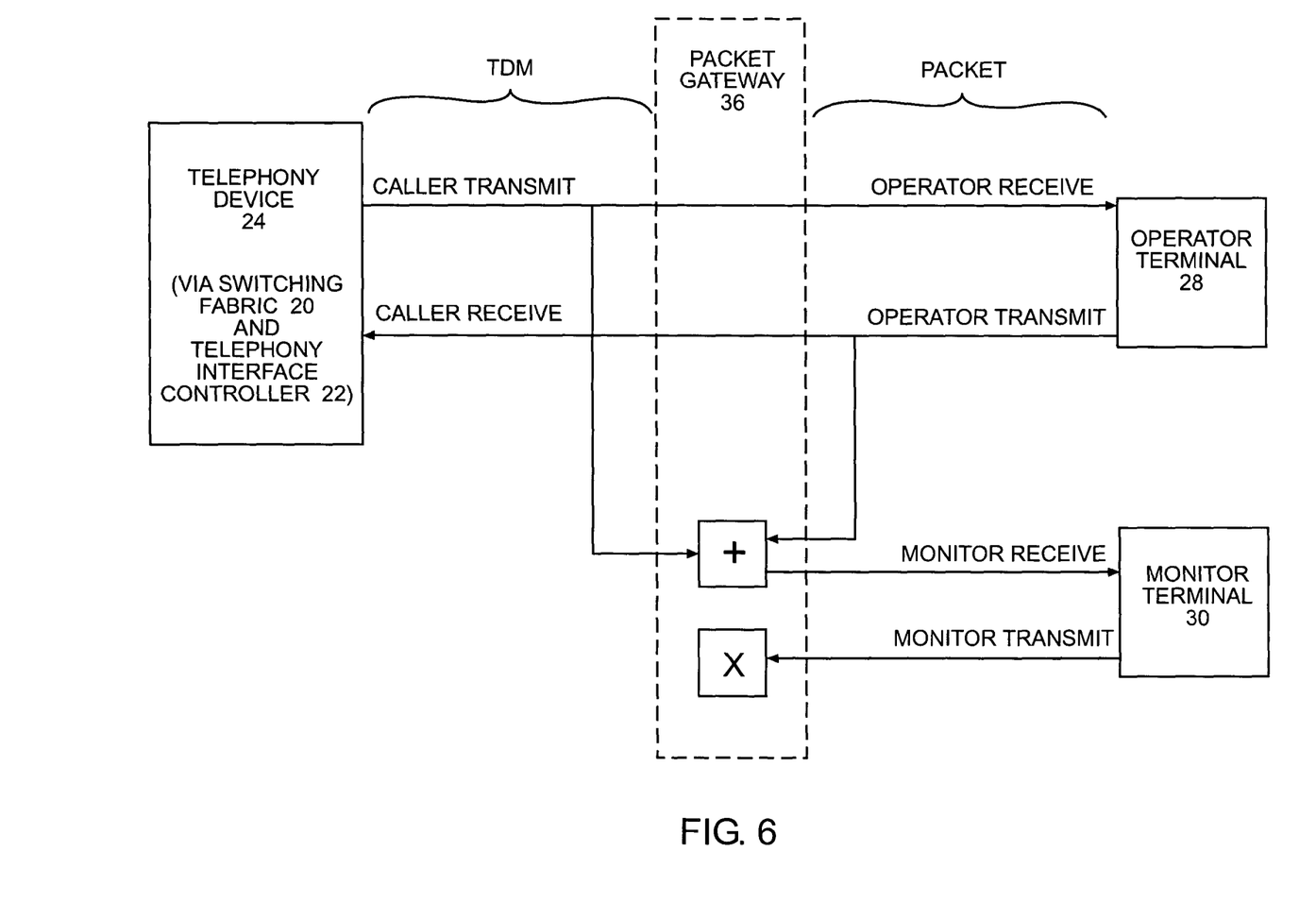
FIG. 6 is a block representation of the functionality of a packet gateway according to one embodiment of the present invention.

With reference to FIG. 6, a graphical representation of the speech paths is illustrated with respect to the packet gateway 36. In essence, the speech path between the packet gateway 36 and the operator terminal 28, as well as the monitor terminal 30, is facilitated using packet communication over voice sessions. The speech paths on the other side of the packet gateway 36 are circuit-switched, and essentially connect to the telephony device 24 via the switching fabric 20 and telephony interface controller 22. Thus, the speech of the caller (caller transmit) is sent via TDM to the packet gateway 36, which will convert it to packet form and send it to the operator terminal 28 (operator receive). The information is also sent to a summing function in the packet gateway 36 (+). The operator speech (operator transmit) is sent to the packet gateway 36 in packet form and converted to TDM to be sent to the telephony device 24 (caller receive). The speech from the operator is also sent to the summing function (+) and summed with the information from the caller to create a composite signal representing the speech of both the caller and operator. The composite signal is sent to the monitor terminal 30 over the packet network 28 (monitor receive). Notably, even if the monitor terminal 30 is capable of creating speech information and transmitting it to the packet gateway 36, the information is not forwarded to the caller or mixed in with the operator's speech to be heard by the caller. As such, the information from the monitor terminal 30 (monitor transmit) is essentially dropped (X).

Based on the above, those skilled in the art will recognize the numerous benefits of the present invention. These benefits include not requiring a dedicated conference port for each monitoring session. By reducing the number of dedicated conference ports, the number of ports and connections used for monitoring in the switching fabric 20 is also reduced. Reducing the number of conference ports daisy chained to facilitate an operator connection as well as a monitor connection improves speech quality provided to the caller. Further, the complexity of the switching control software is reduced and the amount of switching provided by the control system 14 is reduced, since the logic for establishing monitoring capability and facilitating actual monitoring is resident in the packet gateway 36. Avoiding the unnecessary use of resources and the number of hard connections through the switching fabric 20 increases the flexibility of monitoring and reduces the complexity and associated cost thereof.

Those skilled in the art will recognize improvements and modifications to the preferred embodiments of the present invention. All such improvements and modifications are considered within the scope of the concepts disclosed herein and the claims that follow.

What is claimed is:

1. A method for providing operator services comprising:
   a) establishing a connection over a switching fabric of a telephony switch for an operator services call from a caller;
   b) establishing an operator voice session over a packet network with an operator terminal of an operator;
   c) establishing a monitor voice session over the packet network with a monitor terminal of a monitor;
   d) providing an interface between the operator voice session and the connection wherein a packet gateway provides the interface in order to facilitate a voice interaction between the operator and the caller; and
   e) sending the voice interaction to the monitor terminal over the monitor voice session to allow the monitor to listen to the voice interaction between the operator and the caller.

2. The method of claim 1 wherein the operator voice session comprises two packet sessions to facilitate bi-directional communications with the operator terminal and the monitor voice session comprises one packet session to facilitate uni-directional communication of the voice interaction to the monitor terminal.

3. The method of claim 1 further comprising receiving a control message to establish the operator voice session, the control message including indicia to establish the monitor voice session.

4. The method of claim 3 wherein the control message is received from a control system of the telephony switch.

5. The method of claim 1 further comprising converting packets received from the operator terminal to time division multiplexed information to send over the connection, and converting time division multiplexed information from the switching fabric to packets to send over the operator voice session.

6. The method of claim 1 wherein the connection over the switching fabric connects with a conference port.

7. The method of claim 6 further comprising establishing an additional connection over the switching fabric between the conference port and a telephony interface, which is directly or indirectly coupled to a telephony device of the caller.

8. The method of claim 1 further comprising:
   a) establishing a second connection over the switching fabric of the telephony switch for a second operator services call from a second caller;
   b) establishing a second operator voice session over the packet network with the operator terminal of the operator; and
   c) providing an interface between the second operator voice session and the second connection to facilitate a second voice interaction between the operator and the second caller.

9. The method of claim 1 wherein the switching fabric facilitates time division multiplexed connections.

10. A system for providing operator services comprising:
    a) a switching fabric; and
    b) a gateway associated with the switching fabric and adapted to:
       i) establish a connection over the switching fabric for an operator services call from a caller;
       ii) establish an operator voice session over a packet network with an operator terminal of an operator;
       iii) establish a monitor voice session over the packet network with a monitor terminal of a monitor;
       iv) provide an interface between the operator voice session and the connection wherein the interface provided by the gateway facilitates a voice interaction between the operator and the caller; and
       v) send the voice interaction to the monitor terminal over the monitor voice session to allow the monitor to listen to the voice interaction between the operator and the caller.

11. The system of claim 10 wherein the operator voice session comprises two packet sessions to facilitate bi-directional communications with the operator terminal and the monitor voice session comprises one packet session to facilitate uni-directional communication of the voice interaction to the monitor terminal.

12. The system of claim 10 wherein the gateway is further adapted to receive a control message to establish the operator voice session, the control message including indicia to establish the monitor voice session.

13. The system of claim 12 wherein the control message is received from a control system of the telephony switch.

14. The system of claim 10 wherein the gateway is further adapted to:
  a) convert packets received from the operator terminal to time division multiplexed information to send over the connection; and
  b) convert time division multiplexed information from the switching fabric to packets to send over the operator voice session.

15. The system of claim 10 further comprising a conference port and wherein the connection over the switching fabric connects with the conference port.

16. The system of claim 15 further comprising a telephony interface and wherein the gateway is further adapted to establish an additional connection over the switching fabric between the conference port and the telephony interface, which is directly or indirectly coupled to a telephony device of the caller.

17. The system of claim 10 wherein the gateway is further adapted to:
  a) establish a second connection over the switching fabric of the telephony switch for an operator services call from a second caller;
  b) establish a second operator voice session over the packet network with the operator terminal of the operator; and
  c) provide an interface between the second operator voice session and the second connection to facilitate a second voice interaction between the operator and the second caller.

18. The system of claim 10 wherein the switching fabric facilitates time division multiplexed connections.

19. A system for providing operator services comprising:
  a) means for establishing a connection over a switching fabric of a telephony switch for an operator services call from a caller;
  b) means for establishing an operator voice session over a packet network with an operator terminal of an operator;
  c) means for establishing a monitor voice session over the packet network with a monitor terminal of a monitor;
  d) means for providing an interface between the operator voice session and the connection, wherein the means for providing the interface is a packet gateway and the packet gateway provides the interface in order to facilitate a voice interaction between the operator and the caller; and
  e) means for sending the voice interaction to the monitor terminal over the monitor voice session to allow the monitor to listen to the voice interaction between the operator and the caller.

20. The system of claim 19 wherein the operator voice session comprises two packet sessions to facilitate bi-directional communications with the operator terminal and the monitor voice session comprises one packet session to facilitate uni-directional communication of the voice interaction to the monitor terminal.

21. The system of claim 19 further comprising means for receiving a control message to establish the operator voice session, the control message including indicia to establish the monitor voice session.

22. The system of claim 21 wherein the control message is received from a control system of the telephony switch.

23. The system of claim 19 further comprising means for converting packets received from the operator terminal to time division multiplexed information to send over the connection, and means for converting time division multiplexed information from the switching fabric to packets to send over the operator voice session.

24. The system of claim 19 further comprising:
  a) means for establishing a second connection over the switching fabric of the telephony switch for an operator services call from a second caller;
  b) means for establishing a second operator voice session over the packet network with the operator terminal of the operator; and
  c) means for providing an interface between the second operator voice session and the second connection to facilitate a second voice interaction between the operator and the second caller.

* * * * *